(12) United States Patent
Chen

(10) Patent No.: US 7,373,854 B2
(45) Date of Patent: May 20, 2008

(54) BICYCLE GEAR-SHIFTING HANDGRIP

(76) Inventor: Po-Cheng Chen, No. 66, Sec. 4, Chung-Ching N. Road, Taipei (TW)

( * ) Notice: Subject to any disclaimer, the term of this patent is extended or adjusted under 35 U.S.C. 154(b) by 644 days.

(21) Appl. No.: 10/982,278

(22) Filed: Nov. 5, 2004

(65) Prior Publication Data

US 2006/0053937 A1   Mar. 16, 2006

(30) Foreign Application Priority Data

Aug. 11, 2004  (TW) .............................. 93124045 A

(51) Int. Cl.
*F16C 1/12* (2006.01)
(52) U.S. Cl. ..................... 74/501.6; 74/500.5
(58) Field of Classification Search ................. 74/488, 74/489, 501.6, 502, 502.2, 504, 505, 507, 74/527, 567, 569
See application file for complete search history.

(56) References Cited

U.S. PATENT DOCUMENTS

| | | | | |
|---|---|---|---|---|
| 5,676,020 A * | 10/1997 | Jordan et al. | ............ | 74/473.14 |
| 5,784,924 A * | 7/1998 | Wu | .......................... | 74/473.13 |
| 5,802,927 A * | 9/1998 | Yu et al. | .................... | 74/502.2 |
| 5,823,058 A * | 10/1998 | Arbeiter | ....................... | 74/489 |
| 5,921,139 A * | 7/1999 | Yamane | ................... | 74/473.13 |
| 6,467,368 B1 * | 10/2002 | Feng et al. | ................ | 74/501.6 |
| 6,718,844 B2 * | 4/2004 | Hanatani | ................... | 74/502.2 |
| 6,729,203 B2 * | 5/2004 | Wesling et al. | ............ | 74/502.2 |
| 2005/0081672 A1 * | 4/2005 | Chen | ........................... | 74/485 |

* cited by examiner

*Primary Examiner*—Richard Ridley
*Assistant Examiner*—Matthew A. Johnson

(57) ABSTRACT

A bicycle gear-shifting handgrip includes an inner tube fixedly fit over a bicycle handlebar and an outer tube rotatably fit over the inner tube. A casing that is fixed to the handlebar is fit over the inner tube and defines axially spaced front and rear chambers, both surrounding the outer tube. A toothed ring and a detent ring are axially stacked over each other and received in the front chamber. The toothed ring is rotatably fixed but axially movable in the front chamber and has a surface forming plural sets of teeth that are axially biased by a spring to respectively engage detent projections formed on the detent ring. The detent ring is rotatable in unison with the outer tube to induce a camming action between the teeth and the detent projection. A cable-driving ring is received in the rear chamber and is rotatable in unison with the outer tube for pulling a cable coupled to a bicycle derailleur.

13 Claims, 8 Drawing Sheets

BICYCLE GEAR-SHIFTING HANDGRIP

BACKGROUND OF THE INVENTION

1. Field of the Invention

The present invention relates generally to a bicycle, and in particular to a gear-shifting handgrip of the bicycle.

2. Prior Arts

A conventional bicycle gear-shifting handgrip is shown in FIGS. 1, 2A, and 2B, generally designated with reference numeral 1, which allows for hand gripping by a bicycle rider for selectively doing gear shifting. The handgrip 1 comprises a main body 11 mounted on a tube that is fixedly fit over an end of a bicycle handlebar (not shown) and a tubular grip member 12 rotatably fit over the tube of the main body 11 whereby relative rotation is allowed between the main body 11 and the grip member 12. A crank 111 is rotatably fixed on the main body 11 and a transmission cable 121 is connected between the crank 111 and the grip member 12. When the rider rotates the grip member 12, the crank 111 is also rotated. A gear-shifting cable 112 extends from the crank 111 whereby when the crank 111 is rotated, the cable 112 is withdrawn to induce gear shifting.

The grip member 12 has a cylindrical projection having a side wall 125 in which a resilient member 123 is embedded. The side wall also defines a hole 122 to receive and retain an end of the transmission cable 121. A ratcheting ring 113 is fit over the side wall 125 of the grip member 12. The ratcheting ring 113 has an inner circumferential surface along which a plurality of axially-extending recesses 1131 is distributed in an equally spaced manner. A detent pin 124 is arranged between the side wall 125 and the ring 113 and is biased by the resilient member 123 to selectively engage one of the recesses 1131 thereby securing the relative angular position of the grip member 12 with respect to the handle bar, which in turn determines the length of the gear-shifting cable 112 withdrawn due to the rotation of the crank 111.

By forcibly rotating the grip member 12 about the tube of the main body 11, the detent pin 124 is forced to disengage from the current recess 1131 and act against the resilient member 123 to move to a next one of the recesses 1131. This completes the operation of gear-shifting to next sprocket of bicycle derailleur. Each time when the detent pin 124 gains engagement with the next recess 1131 of the ratcheting ring 113, an impact force is generated between the detent pin 124 and the recess 1131 and is transmitted through the grip member 12. This allows the rider to perceive the completion of the gear-shifting operation by tactility of the hand holding the grip member 12.

However, the conventional gear-shifting handgrip is a force-unbalanced device, for there is one detent pin that is movable in radial directions to engage with and/or disengage from the recesses of the ratcheting ring. In addition, such an arrangement makes it a dexterous device (or a sinistral device) only. Interchange between a dexterous rider and a sinistral rider is not possible. The parts are generally not common to both the dexterous device and the sinistral device.

SUMMARY OF THE INVENTION

An objective of the present invention is to provide a bicycle gear-shifting handgrip that allows for a force-balanced operation of gear-shifting.

Another objective of the present invention is to provide a bicycle gear-shifting handgrip that allows for operation in both dexterous and sinistral manner.

In accordance with the present invention, to realize the above objectives, a bicycle gear-shifting handgrip is provided, comprising an inner tube fixedly fit over a bicycle handlebar and an outer tube rotatably fit over the inner tube. A casing that is fixed to the handlebar is fit over the inner tube and defines axially spaced front and rear chambers, both surrounding the outer tube. A toothed ring and a detent ring are axially stacked over each other and received in the front chamber. The toothed ring is rotatably fixed but axially movable in the front chamber and has a surface forming plural sets of teeth that are axially biased by a spring to respectively engage detent projections formed on the detent ring. The detent ring is rotatable in unison with the outer tube to induce a camming action between the teeth and the detent projection. A cable-driving ring is received in the rear chamber and is rotatable in unison with the outer tube for pulling a cable coupled to a bicycle derailleur.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
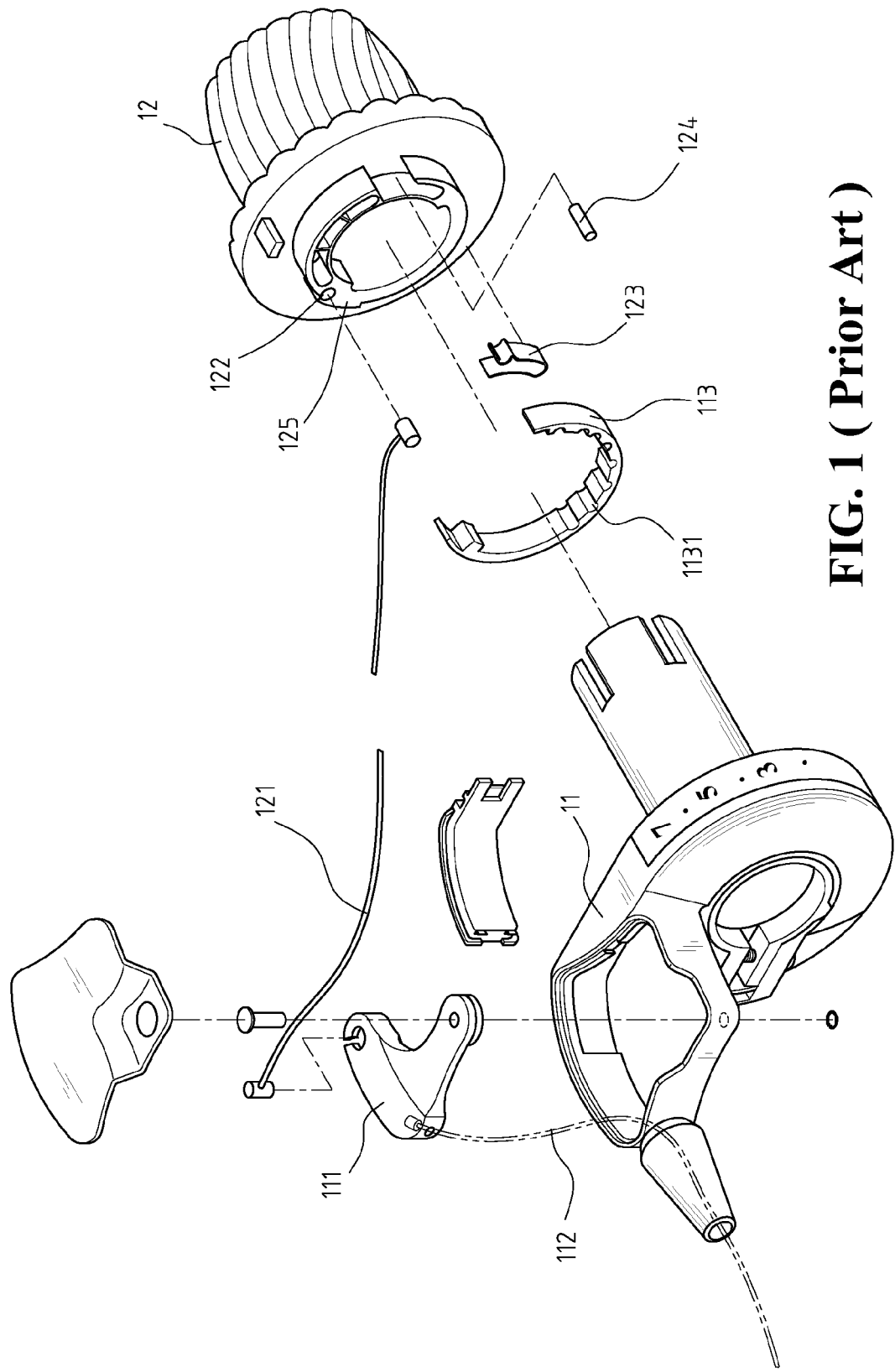
FIG. 1 is an exploded view of a conventional bicycle gear-shifting handgrip.
Figure 2A:
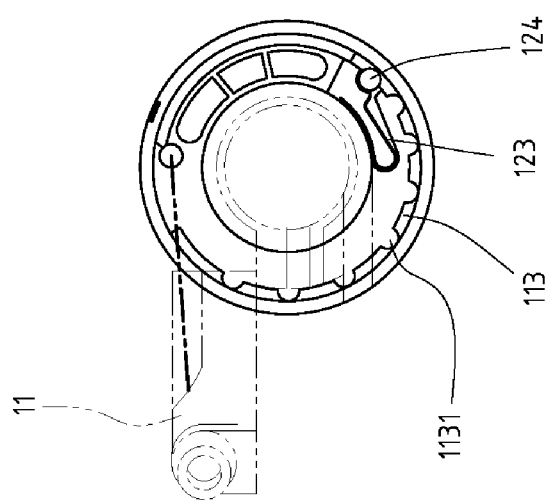
FIG. 2A is an end view of a grip member and a ratcheting ring of the conventional bicycle gear-shifting handgrip in an engaged condition.
Figure 2B:
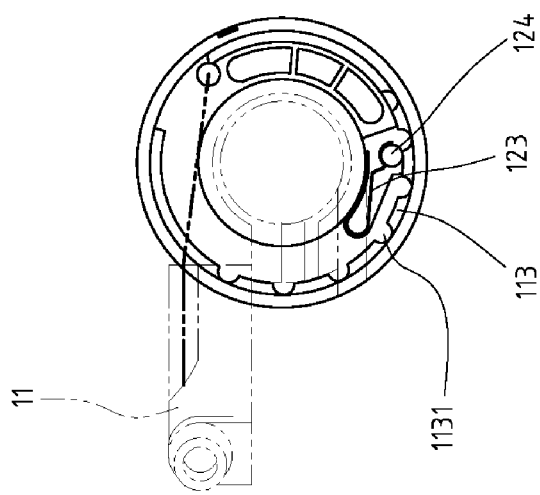
FIG. 2B is another end view of the grip member and the ratcheting ring of the conventional bicycle gear-shifting handgrip in a disengaged condition.
Figure 3:
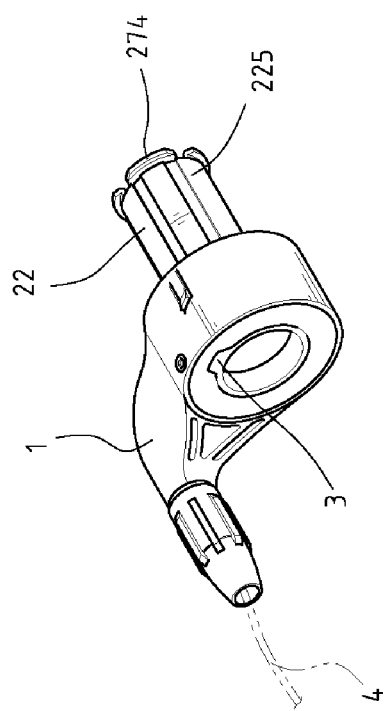
FIG. 3 is a perspective view of a bicycle gear-shifting handgrip constructed in accordance with the present invention.
Figure 4:
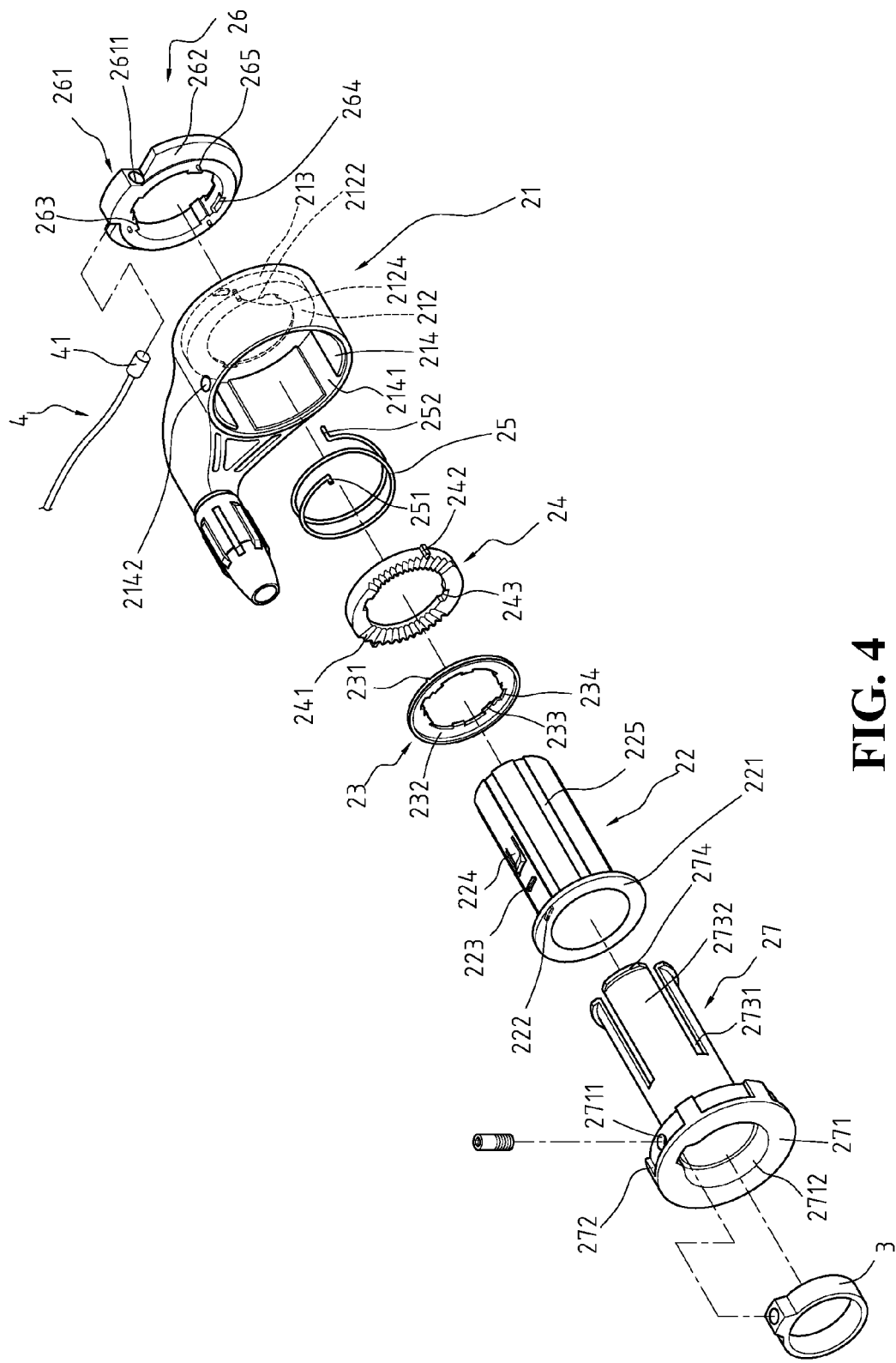
FIG. 4 is an exploded view of the bicycle gear-shifting handgrip of the present invention.

Referring to the drawings and in particular to FIGS. 3 and 4, a bicycle gear-shifting handgrip constructed in accordance with the present invention comprises a cylindrical casing 21 defining an interior space (not labeled), an inner flange 212 formed on and circumferentially extending along an inner surface of the casing 21 and dividing the interior space into a front chamber 214 and a rear chamber 213. The inner flange 212 defines a central bore 2122 communicating between the front chamber 214 and the rear chamber 213.

A sideway projection 1 radially extends from the cylindrical casing 21 and defines a cable passage 211 through which a gear-shifting cable 4 extends, with an end block 41 of the cable 4 projecting into the rear chamber 213. This will be further described.

Figure 5:
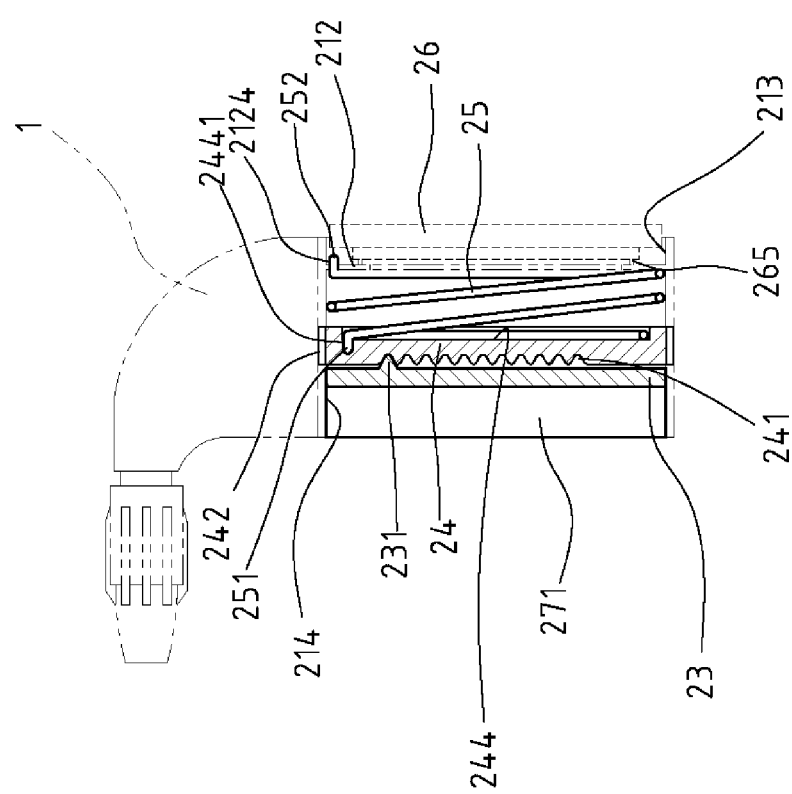
FIG. 5 is a cross-sectional view showing an engaged condition of the bicycle gear-shifting handgrip of the present invention.
Figure 6:
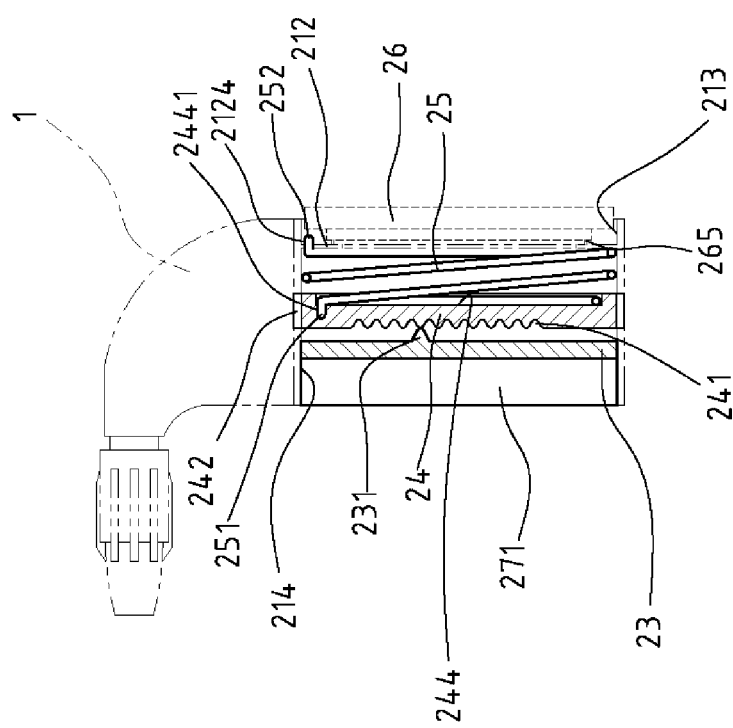
FIG. 6 is another cross-sectional view showing a disengaged condition of the bicycle gear-shifting handgrip of the present invention.

A ratcheting mechanism is received in the front chamber 214. The ratcheting mechanism comprises a toothed ring 24 coaxially received in the front chamber 214. A biasing member 25 is interposed between the toothed ring 24 and the inner flange 212 of the cylindrical casing 21. The toothed ring 24 has a front face on which plural sets of radially-extending teeth 241 are defined. In the embodiment illustrated, two sets of teeth 241 are formed in the front face of the toothed ring 24 and each set is comprised of a number of teeth of which the number may correspond to the number of different speeds that can be switched by the gear-shifting operation. The toothed ring 24 has an opposite rear face 244 opposing the inner flange 212 and cooperating with the inner flange 212 to retain the biasing means therebetween as illustrated in FIG. 5.

The toothed ring 24 has a cylindrical side face on which axially extending ribs 242 are formed. The ribs 242 are received in and engage with axially-extending slots 2141 defined in the inner surface of the cylindrical casing 21 whereby the toothed ring 24 is rotatably fixed to cylindrical casing 21. In the embodiment illustrated, the slots 2141 has a width in the circumferential direction that is larger than a cross-sectional dimension of the rib 242 whereby the toothed ring 24 is allowed for very limited rotation with respect to the cylindrical casing 21.

In the embodiment illustrated, the biasing means comprises a helical spring 25 having opposite ends 251, 252 respectively engaging and thus securely fixed in a hole 2441 defined in the rear face 244 of the toothed ring 24 and a hole 2124 defined in the inner flange 212 of the cylindrical casing 21 for retaining the helical spring 25 between the toothed ring 24 and the inner flange 212. The helical spring 25 biases the toothed ring 24 in a direction away from the inner flange 212.

The ratcheting mechanism also comprises a detent ring 23 received in the front chamber 214 and axially stacked over the toothed ring 24 in a substantially coaxial manner. The detent ring 23 has a rear face on which a plurality of detent projections 231 is formed, each corresponding to and engageable with each set of teeth 241. The toothed ring 24 is biased by the biasing means 25 to have the teeth 241 thereof engaging the detent projections 231 of the detent ring 23.

A rotatable tube 22 has a distal end extending through the detent ring 23, the toothed ring 24, and the central bore 2122 of the inner flange 212 and further projecting through the rear chamber 213 and beyond the cylindrical casing 21 for hand holding by a bicycle rider. The tube 22 forms an outer flange 221 at a proximal end thereof. A plurality of axially-extending flutes 225 is defined in an outer surface of the tube 22. The detent ring 23 has an inner circumference forming retention blocks 233 received in the flutes 225 to fix the detent ring 23 to the tube 22. Thus, the detent ring 23 is rotatable in unison with the rotatable tube 22.

The detent ring 23 has a front face on which an outer flange 232 extending around the detent ring 23 is formed. The outer flange 232 defines a circular space in which the outer flange 221 of the tube 22 is snugly and preferably completely received.

A cable-driving ring 26 is rotatably received in the rear chamber 213. The cable-driving ring 26 has a front face opposing the inner flange 212. Circumferentially-spaced pins 265 extend axially from the front face of the cable-driving ring 26 to have free ends thereof contacting the inner flange 212. This spaces the front face of the cable-driving ring 26 from the inner flange 212, eliminating direct contact between the cable-driving ring 26 and the inner flange 212 so as to avoid unnecessary friction and wearing between the front face of cable-driving ring 26 and the inner flange 212 of the cylindrical casing 21. The cable-driving ring 26 has an inner circumference on which a plurality of retention blocks 263 is formed, which retention blocks 263 are snugly received in and drivingly engage the flutes 225 of the tube 22 whereby the cable-driving ring 26 is rotatable in unison with the tube 22. Thus, when a bicycle rider (not shown) holds and rotates the tube 22, the cable-driving ring 26 is rotated simultaneously.

Figure 7:
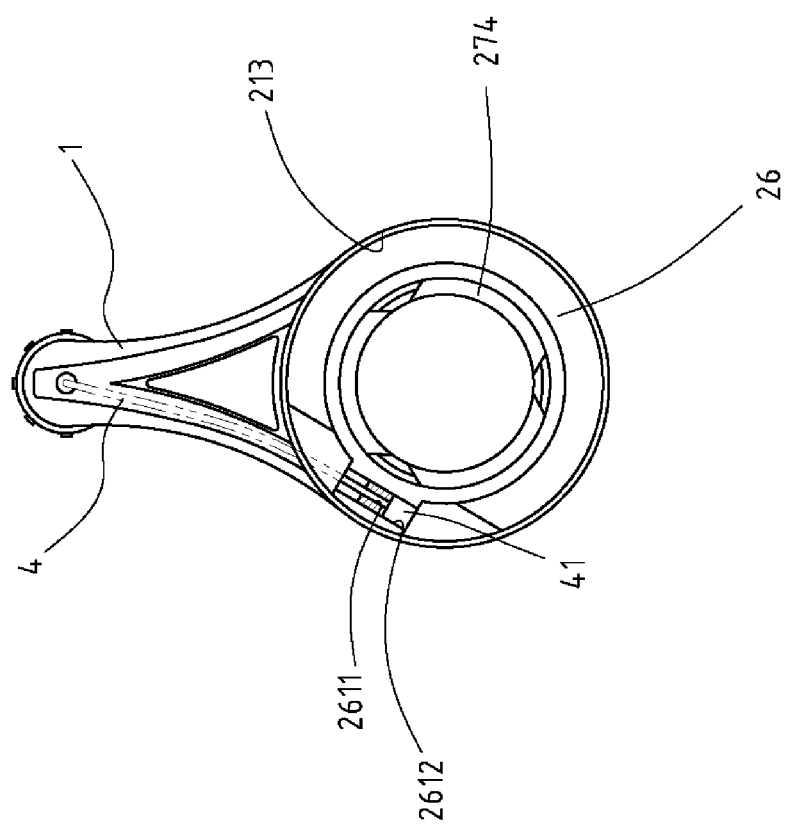
FIG. 7 is an end view of the bicycle gear-shifting handgrip of the present invention.

Also referring to FIG. 7, an arc projection 261 is formed on and extends circumferentially along an outer circumference of the cable-driving ring 26. A passage 2611 extends through the arc projection 261 and has an expanded section 2612. The gear-shifting cable 4 extends through the passage 2611 with the end block 41 received in the expanded section 2612 to effectively retain the cable 4 to the passage 2611. Thus, the rotation of the cable-driving ring 26 caused by the bicycle rider's hand holding and rotating the rotatable tube 22 withdraws a length of the cable 4 through the cable passage 211 of the cylindrical casing 21, which in turn performs gear-shifting.

A cable groove 262 circumferentially extending from the passage 261 is formed in the outer circumference of the cable-driving ring 26 for guiding the movement of withdrawal of the cable 4.

The cable-driving ring 26 is retained on the tube 22 by plural sets of retention blocks, each comprised of first and second retention blocks 223, 224 formed on the tube 22. In the embodiment illustrated, two sets of retention blocks 223, 224 are formed on an outer surface of the tube 22 and angularly spaced from each other by 180 degrees. The first and second retention blocks 223, 224 are axially spaced from each other. The second retention block 224 is supported by a resilient tab that is allowed to inwardly deflect into the tube 22. Notch pairs 264 are defined in an inner circumference of the cable-driving ring 26, respectively corresponding to the retention block sets (223, 224) of the tube 22 and on opposite front and rear faces of the ring 26 whereby a platen (not labeled) is present between the notches 264. The first and second retention blocks 223, 224 are respectively received in and engaging with the notches 264, with the platen sandwiched therebetween, in order to secure the cable-driving ring 26 to the tube 22. The resiliency of the tab that supports the second retention block 224 facilitate fitting the cable-driving ring 26 onto the tube 22 and over the retention blocks 223, 224. The resiliency also retains the engagement of the second retention block 224 with the notch 264 once the fitting is completed.

An inner tube 27 is fit in the rotatable tube 22. A retention ring 271 is formed around a proximal end of the inner tube 27 and is receivingly engageable with the front chamber 214 of the cylindrical casing 21. Projections 272 that are formed on the retention ring 271 are received in the slots 2141 of the cylindrical casing 21 to rotatably fix the inner tube 27 and the cylindrical casing 21 together. The inner tube 27 defines a central bore 2712 in which a handlebar retainer 3 that is fixed to a bicycle handlebar (not shown) is received. A fastener, such as bolt, extends through and/or threadingly engages a hole 2142 defined in the cylindrical casing 21, a hole 2711 defined in the retention ring 271 of the inner tube 27, and a hole defined in the handlebar retainer 3 to releasably fix the gear-shifting handgrip of the present invention to the handlebar, with the handlebar extending through the inner tube 27.

The inner tube 27 has a distal end section 273, opposite to the retention ring 271, in which a plurality of axially-extending slits 2731 is defined, dividing the distal end section 273 into a plurality of circumferentially-spaced resilient plate 2732, which is elastically and inwardly deformable. An end flange 274 having an outside diameter greater than inside diameter of the rotatable tube 22 is formed on a free end of each resilient plate 2732. The resiliency of the plates 2732 facilitates insertion of the inner tube 27, especially the distal end section 273 thereof, through the rotatable tube 22 by means of the inward deformation or deflection of the plates 2732.

The inner tube 27 is of such a length that when the inner tube 27 is completely inserted through the rotatably tube 22, the end flanges 274 snugly engage an end face of the rotatable tube 22 with the outer flange 221 of the rotatable tube 22 abutting against the retention ring 271. The slits 2731 are of such an axial length that a non-slitted section having a non-interrupted, continuous surface is present between the distal end section 273 and the retention ring 271. The non-slitted section underlaps the second retention blocks 224 of the rotatable tube 22 when the inner tube 27 is fit into the rotatable tube 22. This prevents the resilient tabs that support the second retention blocks 224 from unexpected inward deformation, leading to accidental separation of the cable-driving ring 26 from the rotatable tube 22 and the rear chamber 213 of the cylindrical casing 21.

Notches 234, 243 are defined, respectively, in inner circumferences of the detent ring 23 and the toothed ring 24 in order to allow the first and second retention blocks 223, 224 to pass when the rotatable tube 24 extends through the detent ring 23 and the toothed ring 24. Projections 222, extending in the axial direction, are formed on the outer flange 221 of the rotatable tube 22 for engaging the notches 234 to more securely fix the detent ring 23 to the rotatable tube 22.

Referring to FIG. 5, in a normal condition where a bicycle is in operation with a fixed one of sprockets constituting a bicycle derailleur, the detent projections 231 of the detent ring 23 engage the teeth 241 respectively, which ensures that the derailleur is kept in the selected sprocket. To switch from the original sprocket of the derailleur to a next one of the sprockets, a rider having a hand holding the rotatable tube 22 rotates the tube 22 in either clockwise direction or counterclockwise, which causes the detent ring 23 to rotate. The rotation of the detent ring 23 breaks the engagement of the detent projections 231 and the teeth 241 and due to camming action between the detent projections 231 and the teeth 241, the toothed ring 24 is forced to move axially against the biasing member 25 to allow the detent projections 231 to move to next angular positions.

At the same time, the cable-driving ring 26 is also rotated in unison with the tube 22, which withdraws a predetermined length of the cable 4, causing the derailleur to switch to the next sprocket and realizing the sprocket switching operation.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A bicycle gear-shifting handgrip adapted to fit over a bicycle handlebar for gear-shifting a bicycle derailleur, the handgrip comprising:
    a cylindrical casing adapted to fix to the bicycle handlebar, the casing forming an interior space delimited by an inner surface, a circumferential flange formed on and circumferentially extending along the inner surface to divide the interior space into first and second chambers that communicate with each other by a central bore defined in the circumferential flange;
    a toothed ring coaxially received in the first chamber and having a first surface that is opposite to the circumferential flange and forming a plurality of tooth sets circumferentially distributed on the first surface, each set comprising a number of teeth distributed in the circumferential direction of the toothed ring, the toothed ring being axially displaceable while substantially rotatably fixed in the first chamber;
    a detent ring coaxially received in the first chamber and having a second surface opposing the first surface of the toothed ring and forming detent projections engageable with the teeth of each tooth set of the tooth ring;
    biasing means that bias the toothed ring toward the detent ring to have the detent projections releasably engaging the tooth sets;
    a rotatable tube adapted to rotatably fit over the handlebar, the rotatable tube having a first end extending through both the detent ring and the toothed ring and comprising means for rotatably and axially fixing the detent ring to the rotatable tube, the first end further extending through the central bore of the circumferential flange of the casing and the second chamber; and
    a cable-driving ring rotatably received in the second chamber and fit over the rotatable tube, the cable-driving ring comprising means for rotatably and axially fixing the cable-driving ring to the rotatable tube and means for coupling a cable that extends from the derailleur
    wherein rotation of the rotatable tube causes the detent ring to rotate with respect to the toothed ring, inducing a camming action between the teeth of the toothed ring and the detent projections of the detent ring to axially displace the toothed ring away from the detent ring and thus allowing the detent projections to move an adjacent tooth in each tooth set and wherein the rotation of the rotatable tube causes the cable-driving ring to rotate, which withdraws a predetermined length of the cable to induce gear-shifting of the derailleur.

2. The bicycle gear-shifting handgrip as claimed in claim 1, wherein the biasing means comprises a helical spring disposed between the circumferential flange of the casing and the toothed ring and having ends respectively fixed to the casing and the toothed ring to bias the toothed ring toward the detent ring.

3. The bicycle gear-shifting handgrip as claimed in claim 1, wherein the toothed ring forms two sets of teeth, and the detent ring forms two detent projections respectively engageable with the two tooth sets of the toothed ring.

4. The bicycle gear-shifting handgrip as claimed in claim 1, wherein axially-extending slots are defined in the inner surface of the first chamber and wherein axially-extending ribs are formed on a cylindrical outer surface of the toothed ring and slidably received in the slots.

5. The bicycle gear-shifting handgrip as claimed in claim 1, wherein the means for rotatably and axially fixing the cable-driving ring to the rotatable tube comprises at least one block pair comprising first and second retention blocks formed on an outer surface of the rotatable tube and axially spaced from each other a first distance, the cable-driving ring having an inner circumference in which a pair of notches is formed, the notches being axially spaced from each other a second distance that is substantially corresponding to the first distance, the retention blocks being receivingly engageable with the notches to rotatably and axially fix the cable-driving ring to the rotatable tube.

6. The bicycle gear-shifting handgrip as claimed in claim 5, wherein the second retention block is supported by a resilient tab, which is elastically deformable in an inward direction to facilitate engagement of the second retention block with the associated notch.

7. The bicycle gear-shifting handgrip as claimed in claim 6 further comprising an inner tube snugly fit through the rotatable tube, the inner tube comprising a section having a surface underlapping the resilient tab to prevent the resilient tab from inward deformation after the cable-driving ring is fit over the rotatable tube and secured by the retention blocks, and thus securely retaining the cable-driving ring on the rotatable tube.

8. The bicycle gear-shifting handgrip as claimed in claim 1 further comprising an inner tube adapted to fit over and fix to the handlebar, the inner tube being snugly fit through the rotatable tube and comprising an expanded free end engaging an end face of the rotatable tube and an opposite end on which a retention ring is formed, the retention ring comprising means for securing the retention ring in the first chamber.

9. The bicycle gear-shifting handgrip as claimed in claim 8, wherein the means for securing the retention ring of the inner tube to the first chamber of the casing comprises axially-extending slots defined in the inner surface of the first chamber and projections formed on the retention ring and received in the slots of the first chamber.

10. The bicycle gear-shifting handgrip as claimed in claim 1, wherein the cable-driving ring has a surface opposing the circumferential flange, spacing pins extending from the surface of the cable-driving ring and having free ends contacting the circumferential flange to axially space the cable-driving ring from the circumferential flange and reducing friction therebetween caused by direct contact.

11. The bicycle gear-shifting handgrip as claimed in claim 1, wherein the casing has an outer surface on which a sideway projection is formed, the sideway projection defining a passage through which an end of the cable extends to attach to the cable-driving ring.

12. The bicycle gear-shifting handgrip as claimed in claim 1, wherein the means for rotatably and axially fixing the cable-driving ring to the rotatable tube comprises axially-extending flutes defined in an outer surface of the rotatable tube and retention blocks that are formed in an inner circumference of the cable-driving ring and engaging the flutes.

13. The bicycle gear-shifting handgrip as claimed in claim 1, wherein the detent ring has a third surface opposite to the second surface, the third surface forming a surrounding outer flange defining a circular space, and wherein the rotatable tube has an end circumferential flange snugly received in the circular space, the means for rotatably and axially fixing the detent ring to the rotatable tube comprising axially-extending projections formed on the end circumferential flange and engaging notches defined in an inner circumference of the detent ring.

* * * * *